(12) United States Patent
Hundeby

(10) Patent No.: US 6,397,952 B1
(45) Date of Patent: Jun. 4, 2002

(54) BREAKAWAY FOR FIELD MARKER ON AGRICULTURAL IMPLEMENT

(75) Inventor: David R. Hundeby, Saskatoon (CA)

(73) Assignee: Flexi-Coil Ltd, Saskatoon (CA)

( * ) Notice: Subject to any disclaimer, the term of this patent is extended or adjusted under 35 U.S.C. 154(b) by 0 days.

(21) Appl. No.: 09/428,528

(22) Filed: Oct. 28, 1999

(30) Foreign Application Priority Data

Oct. 30, 1998 (CA) ............................................. 2252296

(51) Int. Cl.[7] ............................................... A01B 69/02
(52) U.S. Cl. ...................................................... 172/126
(58) Field of Search .......................... 172/126; 33/624, 33/111, 264, 1 H, 20.1; 239/168

(56) References Cited

U.S. PATENT DOCUMENTS

| | | | | |
|---|---|---|---|---|
| 2,175,282 A | * | 10/1939 | Cormany | 172/126 |
| 3,627,057 A | * | 12/1971 | Hartwig | 172/126 |
| 4,822,012 A | * | 4/1989 | Sketo | 267/221 |
| 5,000,385 A | * | 3/1991 | Trusty et al. | 239/168 |
| 5,542,190 A | * | 8/1996 | Wahls | 172/126 |
| 5,785,128 A | * | 7/1998 | Redekop | 172/126 |
| 5,957,216 A | * | 9/1999 | Redekop | 172/126 |
| 6,027,039 A | * | 2/2000 | Mercil | 239/159 |
| 6,119,963 A | * | 9/2000 | Bastin et al. | 239/168 |

* cited by examiner

*Primary Examiner*—Robert E. Pezzuto
*Assistant Examiner*—Nathan Mammen
(74) *Attorney, Agent, or Firm*—Larry W. Miller; John William Stader

(57) ABSTRACT

A field marker for mounting on an agricultural implement includes an elongated arm adapted to project outwardly laterally of the implement when in its operating position and is adapted to carry a field marking device at its outer distal end for making a score mark on the ground. A mount for the arm at an inner proximal end thereof allows pivoting of the arm abut first and second transverse axes whereby to allow the arm to swing upwardly and downwardly about the first one of the axes when operating on uneven ground while also allowing the arm to swing around the second of the axes from its outwardly projecting operating position into another position. The arm includes inner and outer arm sections secured together by a folding joint to permit the inner and outer arm sections to be folded into juxtaposition with one another and brought into the transport position. An extensible actuator effects relative rotation of the inner and outer arm sections, and a mechanism interacts with the inner and outer arm sections and the actuator such that as the inner arm section is pivoted through a selected angle, the outer arm section is pivoted about the folding joint relative to the inner arm section. A breakaway link on the arm permits the arm to swing as a whole relative to the mount about the second axis away from its outwardly projecting operating position when an obstacle is encountered and a predetermined force on the arm has been exceeded. The breakaway link has a resetting device associated therewith for returning the arm to the operating position once the obstacle has been cleared.

12 Claims, 18 Drawing Sheets

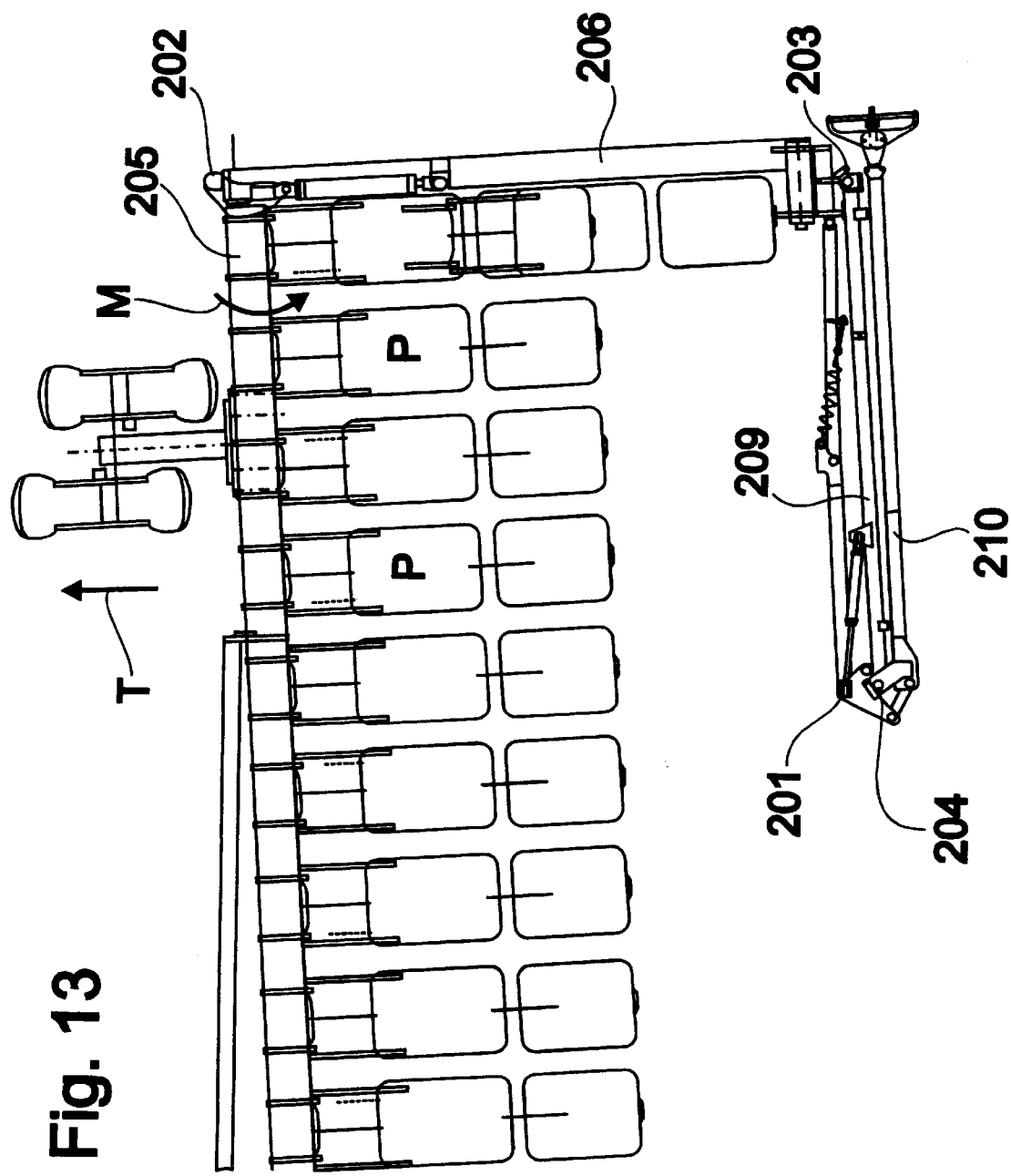

BREAKAWAY FOR FIELD MARKER ON AGRICULTURAL IMPLEMENT

BACKGROUND OF THE INVENTION

This invention relates to a field marker for mounting on an agriculture implement to generate a marked line on the ground indicative of the path of the implement.

Field markers are commonly used on farming implements to score a mark outward from one side of an implement when making an operating pass so that the mark may act as a directional guide to the operator on a subsequent pass. Folding field markers are also common so that long arms may be compactly folded inward to the implement for more compact transportation between operating locations.

An example of a folding field marker is shown in U.S. Pat. No. 5,027,525, issuing to Haukass, which shows a bi-fold field marker having a device which automatically folds the outer arm to lie along the inner arm when an actuator acts on the inner arm to fold it inward to the implement on which it is mounted. This particular field marker is also exemplary of the incorporation of a breakaway device which allows the arm to fold rearwardly when it encounters an obstacle. The spring of this breakaway device includes a spring serving two functions, one being to provide resetting force for the break action provided by a cradle, the other being to serve as a down force biasing means. The spring provides bias to relieve some of the weight of the marker arm to vary the downward force with which the end of the marker scores the ground. The spring of the Haukaas patent, depending on soil hardness or other variables, can be difficult to adjust to give the most desirable combination of resetting force and down force. It is known that the design disclosed in the Haukaas patent is often manufactured with a shear pin to retain the marker in the field position and which must be replaced after a breakaway action occurs; otherwise the resetting spring is not able to return and maintain the arm in the operating position.

The Haukaas design has a mount structure with two members connected by a horizontal pivot to allow the outer end of the marker arm vertical movement relative to the implement over uneven ground. An additional member, a cradle, is provided with a vertical joint to allow a breakaway action.

SUMMARY OF THE INVENTION

It is an object of this invention to provide a field marker with an automatically re-setting breakaway mechanism.

It is a feature of this invention that the field marker allows for independent setting of breakaway resetting force and down force biasing.

It is still another object of this invention to improve the action of the folding arm in a folding field marker.

It is an advantage of this invention to provide a mounting for a field marker that is manufactured with fewer parts than previously known in the prior art.

A field marker for mounting on an agricultural implement in accordance with one aspect of the invention includes an elongated arm adapted to project outwardly laterally of the implement when in its operating position and being adapted to carry a field marking device at its outer distal end for making a score mark on the ground, a mount for said arm at an inner proximal end thereof allowing pivoting of said arm about first and second generally transverse axes whereby to allow the arm to swing upwardly and downwardly about the first one of said axes when operating on uneven ground while also allowing said arm to swing around the second one of said axes from its outwardly projecting operating position into another position; and a breakaway link pivotally connected to said mount and extending alongside said arm to retain said arm in the operating position but which permits said arm to swing relative to said mount about the second axis away from its outwardly projecting operating position when an obstacle is encountered and a predetermined force on said arm has been exceeded, said breakaway link having a resetting device associated therewith to assist in returning said arm to the operating position once the obstacle has been cleared.

The breakaway link preferably extends in general parallelism to said arm when the latter is in the operating condition.

In one embodiment the breakaway link extends from a pivot point on said mount which is spaced from the second axis to a pivot point associated with said arm, said breakaway link comprising a pair of link members hinged together and adapted to move from (a) a slightly misaligned condition where the breakaway link acts as a rigid link capable of withstanding compressive forces arising from draft forces on said arm during normal operation whereby to inhibit the arm from swinging about the second axis on said mount to (b) a collapsed condition corresponding to a breakaway position of the arm after an obstacle has been encountered.

The above-noted resetting device typically comprises a biasing device which tends to hold the breakaway link members in the slightly misaligned condition until the predetermined force has been exceeded and the collapsed condition of the breakaway link members occurs.

Adjustment means may be provided for varying the degree of misalignment between said breakaway link members whereby to enable the force causing breakaway to be predetermined.

In another embodiment the breakaway link may include a compressible member which compresses when the predetermined force has been exceeded to permit swinging of the arm away from its operating position. The compressible member preferably includes a pair of telescoping members having a compression spring thereon to bias said members in directions away from one another.

The field marker arm typically includes inner and outer arm sections secured together by a folding joint to permit said inner and outer arm sections to be folded and brought into the transport position. An actuator is preferably provided for effecting the folding about said folding joint of said inner and outer arm sections into and out of the transport position, said actuator also holding said inner and outer arm sections in general alignment as the arm is swung away from its operating position when an obstacle is encountered.

The folding joint in one embodiment includes a crank arm and a fold link associated therewith and wherein said breakaway link extends from said pivot point on said mount in spaced generally parallel relation to said inner arm section to a pivot point on said crank arm, with the crank arm and fold link adapted to cooperate with the breakaway link such that as said inner arm section is rotated, said outer arm section rotates relative thereto.

Preferably said actuator is connected between said inner arm section and said crank arm whereby extension and retraction of said actuator effects rotation of the crank arm relative to said inner arm section and at the same time by virtue of the interaction between the linkages defined by said breakaway link, crank arm, mount and inner arm section effects the rotation of the inner arm section relative to said mount.

The field marker preferably includes a biasing device acting between said mount and said arm to apply lifting forces to the arm whereby the field marking device is provided with the required degree of total down force as to enable a suitable score mark to be made.

The preferred embodiment of the present invention has a simplified marker arm mounting structure having only two main members. The marker arm is connected to the second member on a generally vertical axis to allow folding and unfolding of the marker arm. In the present embodiment this same vertical axis also provides for the breakaway action. The second member is attached to a first member directly on a horizontal axis. This allows the second member to pivot about the first member, and allows the outer end of the marker arm vertical movement when operating over uneven ground. In the transport position the vertical axis is held generally vertical or slightly inclined inwardly. In the operating position, the vertical axis is slightly inclined outwardly.

A field marker for mounting on an agricultural implement in accordance with another aspect of the invention includes an elongated arm adapted to project outwardly laterally of the implement when in its operating position and being adapted to carry a field marking device at its outer distal end for making a score mark on the ground, a mount for said arm at an inner proximal end thereof allowing pivoting of said arm about first and second generally transverse axes whereby to allow the arm to swing upwardly and downwardly about the first one of said axes when operating on uneven ground while also allowing said arm to swing around the second one of said axes from its outwardly projecting operating position into a transport position; said arm including inner and outer arm sections secured together by a folding joint to permit said inner and outer arm sections to be folded into juxtaposition with one another and brought into the transport position, an actuator mounted to said inner arm section for effecting rotation of said inner and outer arm sections, and a mechanism interacting between said mount and said inner and outer arm sections and connected to said actuator such that as said inner arm section is pivoted by said actuator through a selected angle relative to said mount, said outer arm section is pivoted about said folding joint through an angle relative to said inner arm section substantially greater than the extent of said selected angle.

The above-noted mechanism in a preferred form of the invention is adapted to effect pivoting of said outer arm section through an angle approximately twice the extent of the angle through which said inner arm section pivots.

The mechanism noted above preferably includes an elongated link extending generally parallel to said inner arm section from said mount, and a crank arm pivotally connected between distal end portions of the inner arm section and said elongated link, said crank arm being linked to said outer arm section, and said actuator being connected such that as it extends and retracts said crank arm is rotated and said inner and outer arm sections are caused to pivot relative to one another.

These and other objects, features and advantages can be accomplished according to the instant invention by providing a field marker for mounting on an agricultural implement, the field marker including an elongated arm adapted to project outwardly laterally of the implement when in its operating position and being adapted to carry a field marking device at its outer distal end for making a score mark on the ground. A mount for the arm at an inner proximal end thereof allows pivoting of the arm about first and second transverse axes whereby to allow the arm to swing upwardly and downwardly about the first one of said axes when operating on uneven ground while also allowing the arm to swing around the second one of said axes from its outwardly projecting operating position into another position. The arm includes inner and outer arm sections secured together by a folding joint to permit the inner and outer arm sections to be folded into juxtaposition with one another and brought into the transport position. An extensible actuator effects relative rotation of the inner and outer arm sections, and a mechanism interacts with the inner and outer arm sections and the actuator such that as the inner arm section is pivoted through a selected angle, the outer arm section is pivoted about said folding joint relative to the inner arm section. A breakaway link on the arm permits the arm to swing as a whole relative to the mount about the second axis away from its outwardly projecting operating position when an obstacle is encountered and a predetermined force on said arm has been exceeded. The breakaway link has a resetting device associated therewith for returning the arm to the operating position once the obstacle has been cleared.

BRIEF DESCRIPTION OF THE DRAWINGS

The advantages of this invention will be apparent upon consideration of the following detailed disclosure of the invention, especially when taken in conjunction with the accompanying drawings wherein:

FIG. 13 is a top plan view of a field marker incorporating the principles of the present invention, the field marker being depicted in transport position.

DETAILED DESCRIPTION OF THE PREFERRED EMBODIMENT

Figure 1:
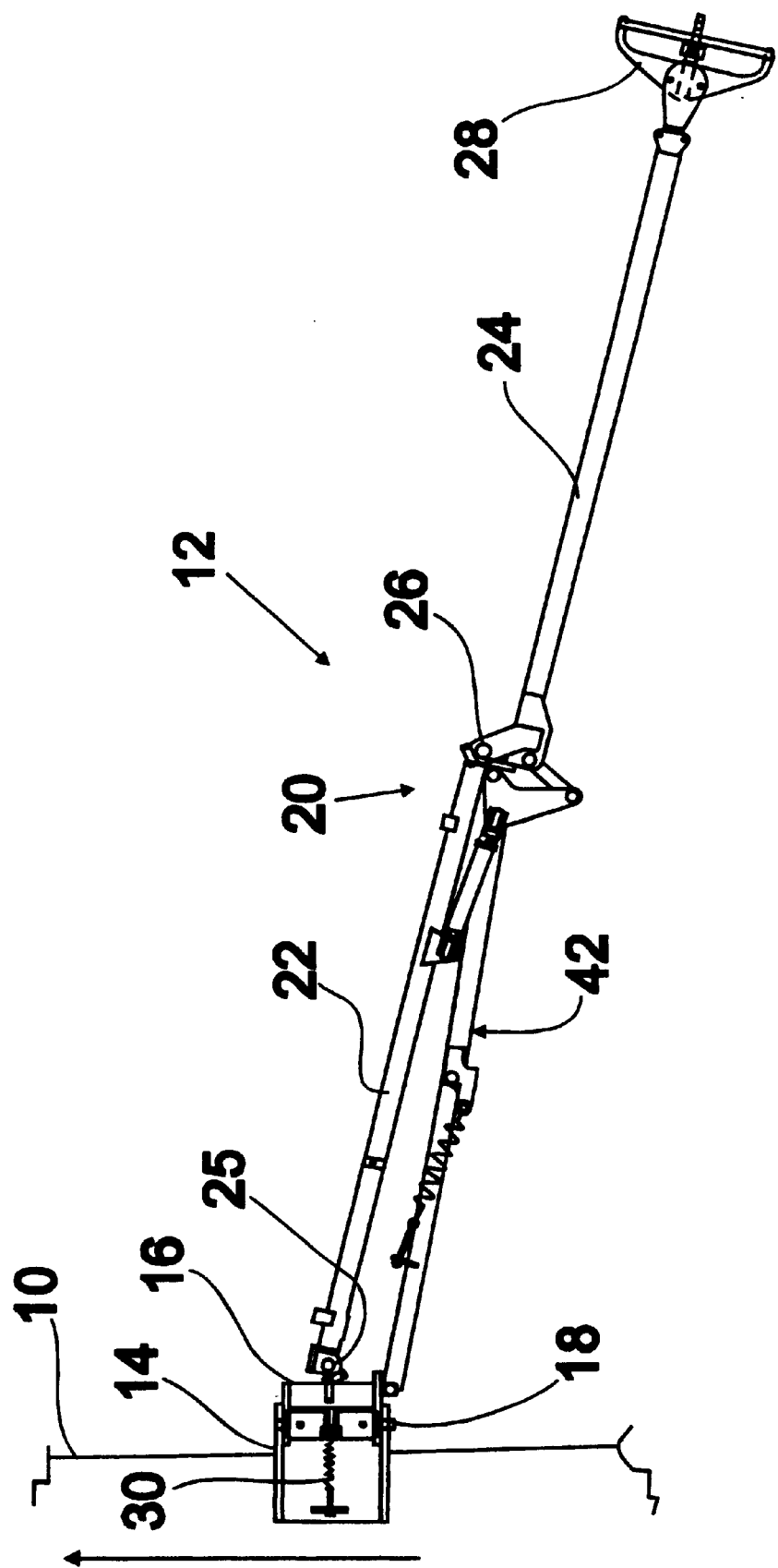
FIG. 1 is a top plan view of a field marker incorporating the principles of the present invention, the field marker is depicted in an operational position.
Figure 2A:
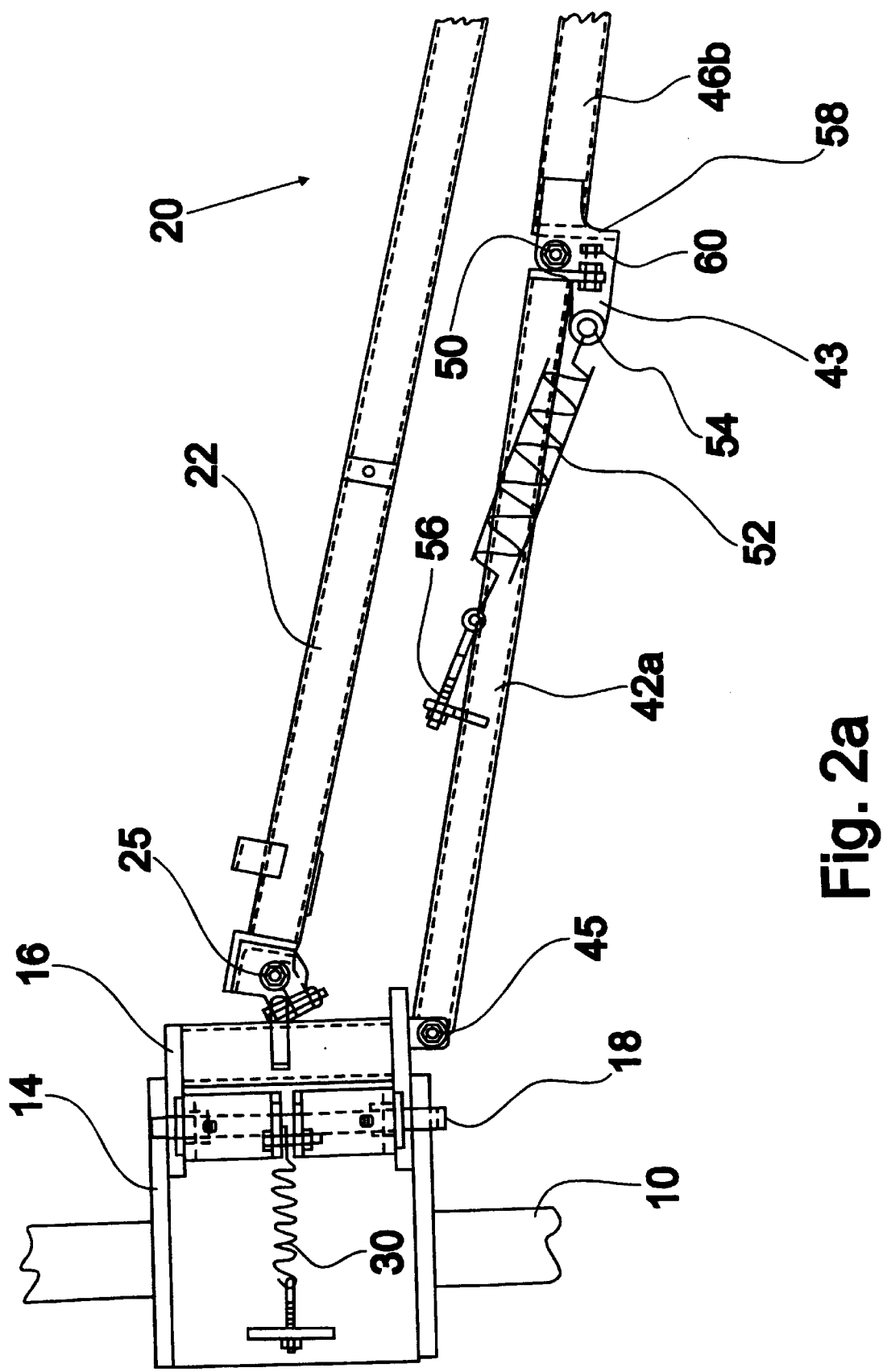
FIGS. 2A, 2B and 2C are top plan views of the inner, middle and outer portions respectively of the field marker as shown in FIG. 1.
Figure 2B:
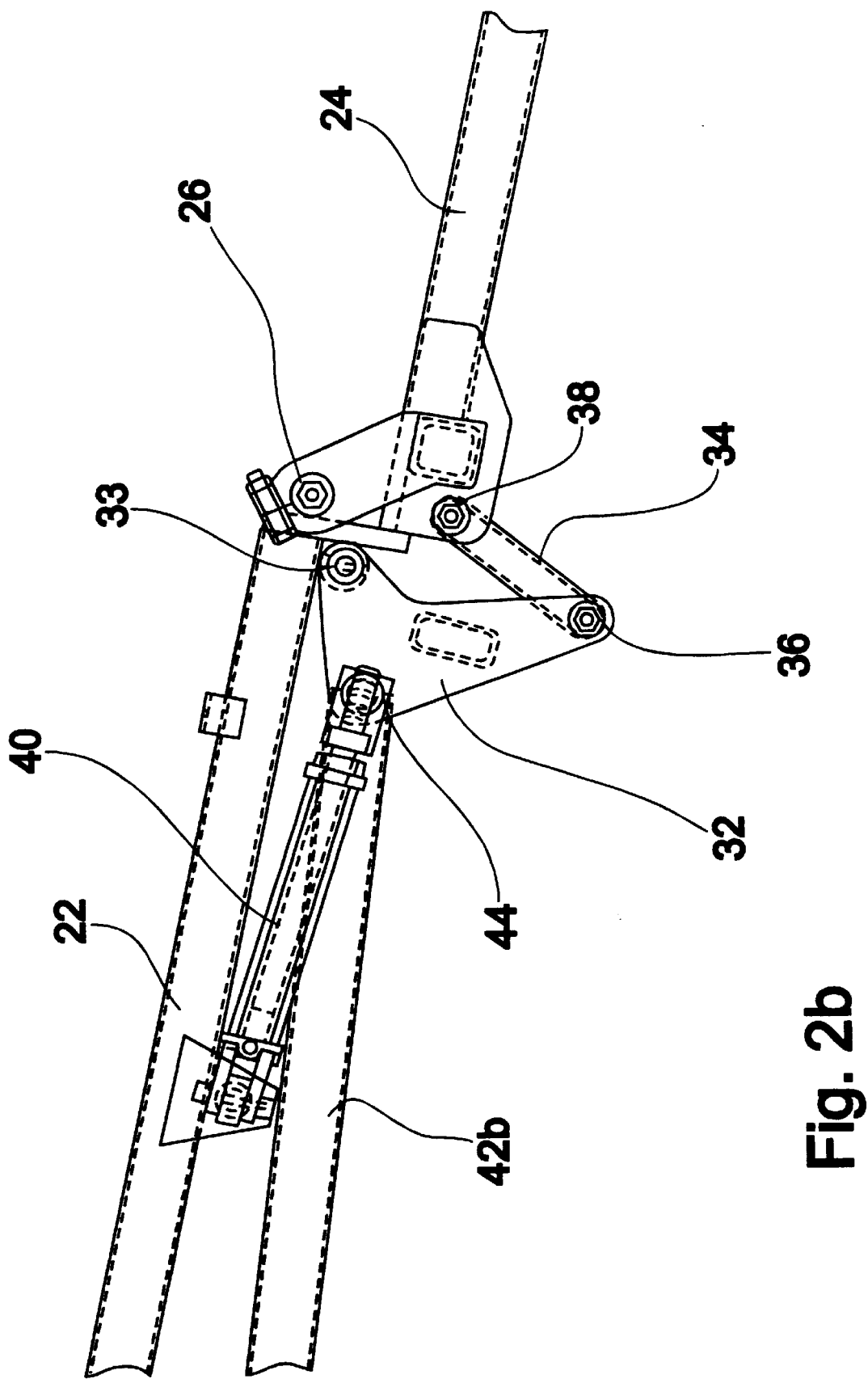
Figure 2C:
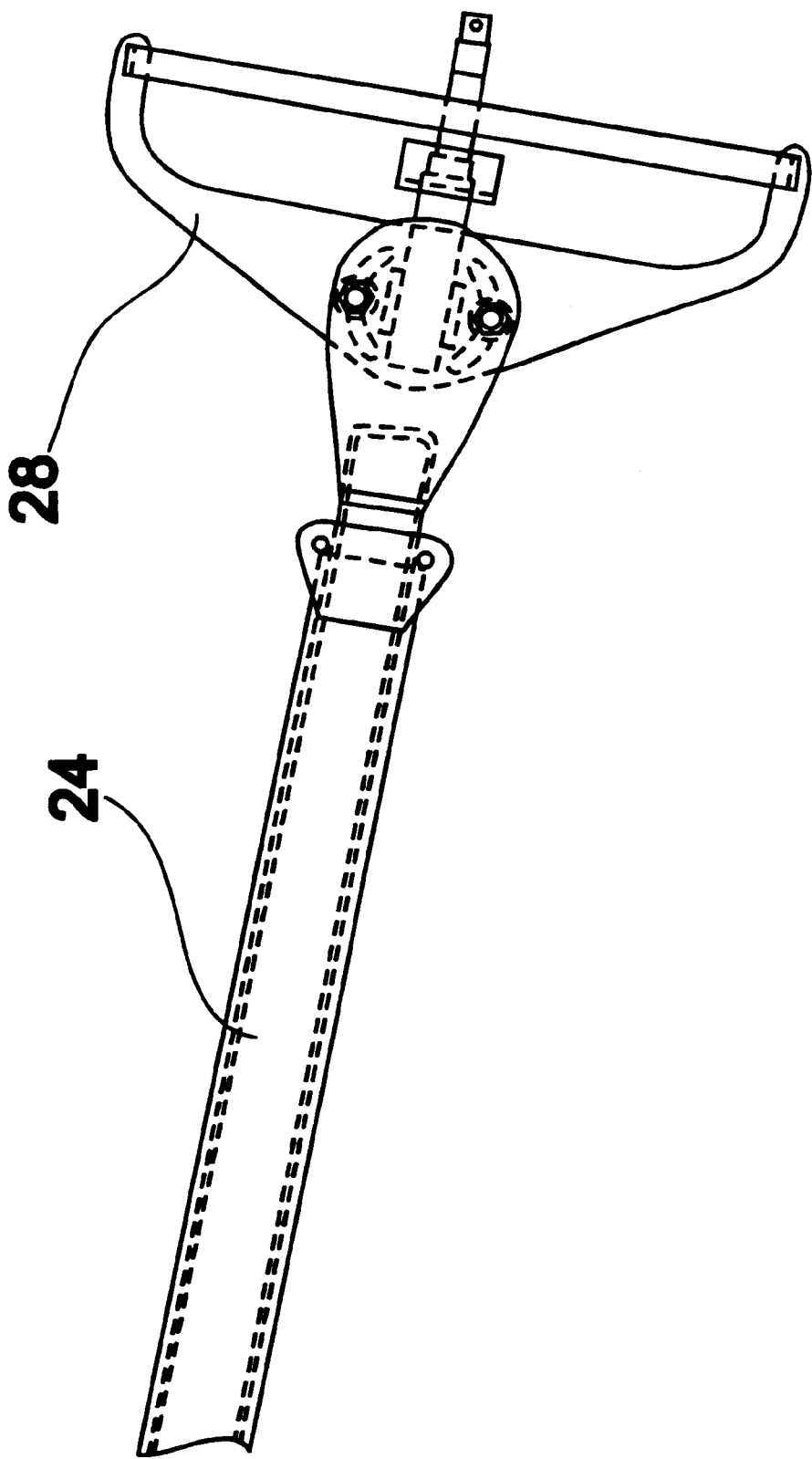
Figure 3A:
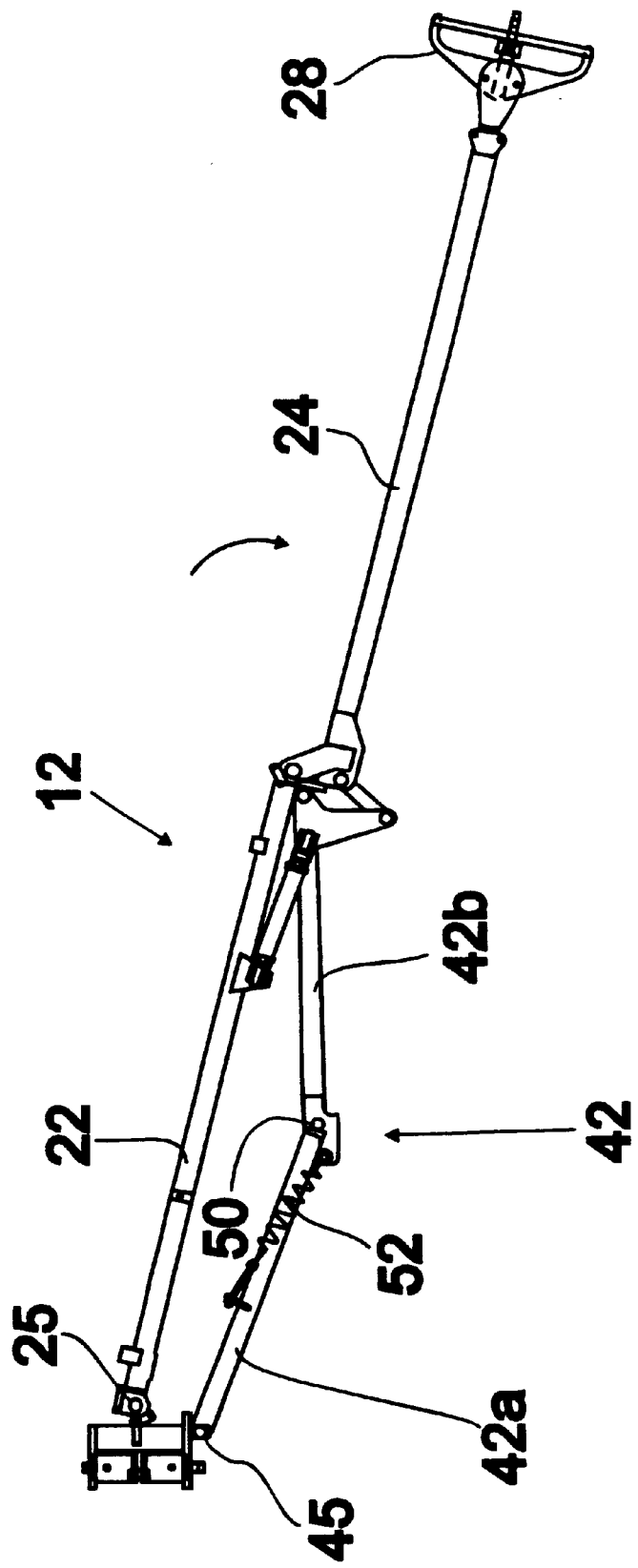
FIGS. 3a and 3b are top plan views respectively of the field marker as the marker arm swings away after encountering an obstacle.
Figure 3B:
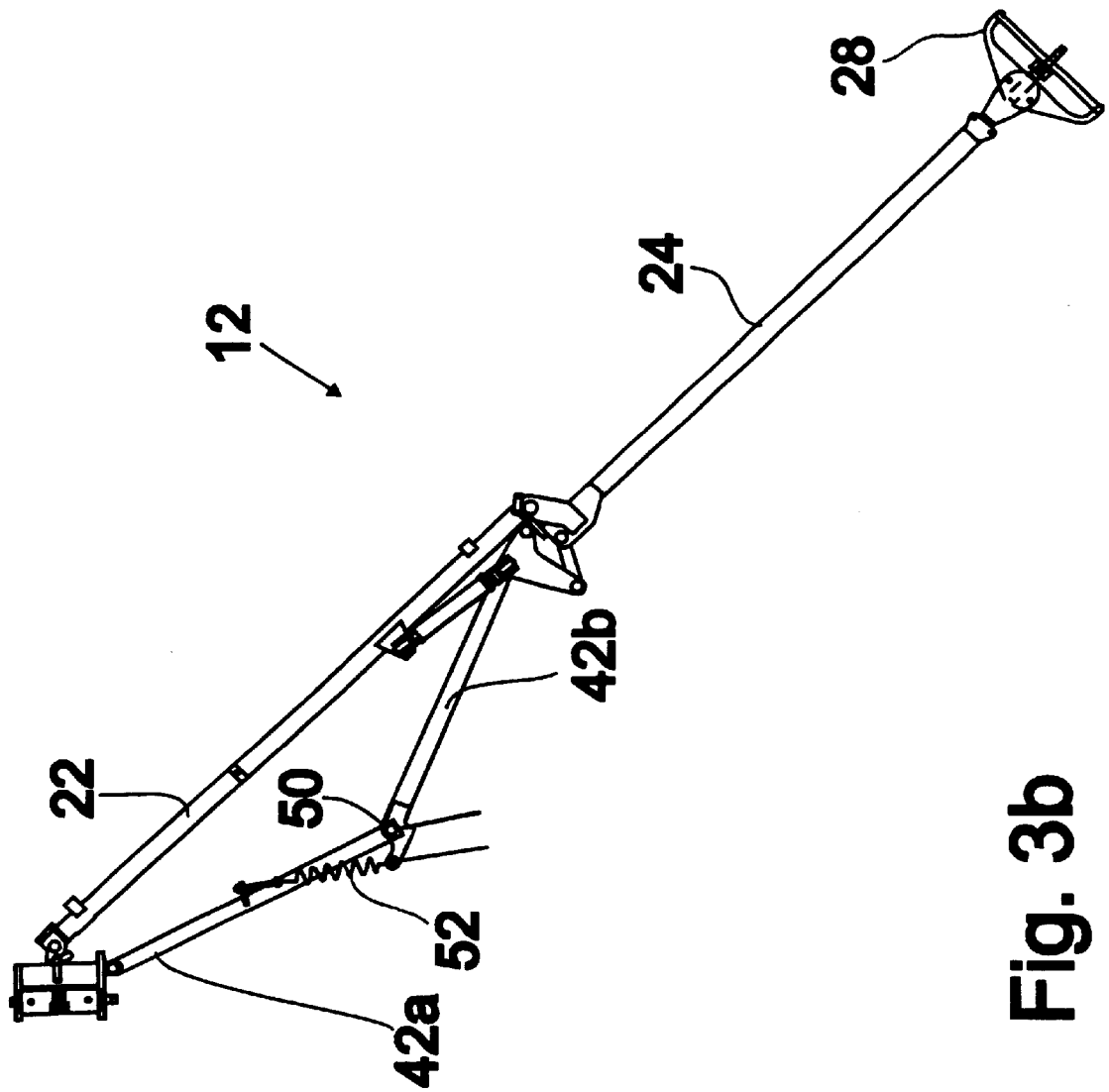
Figure 4:
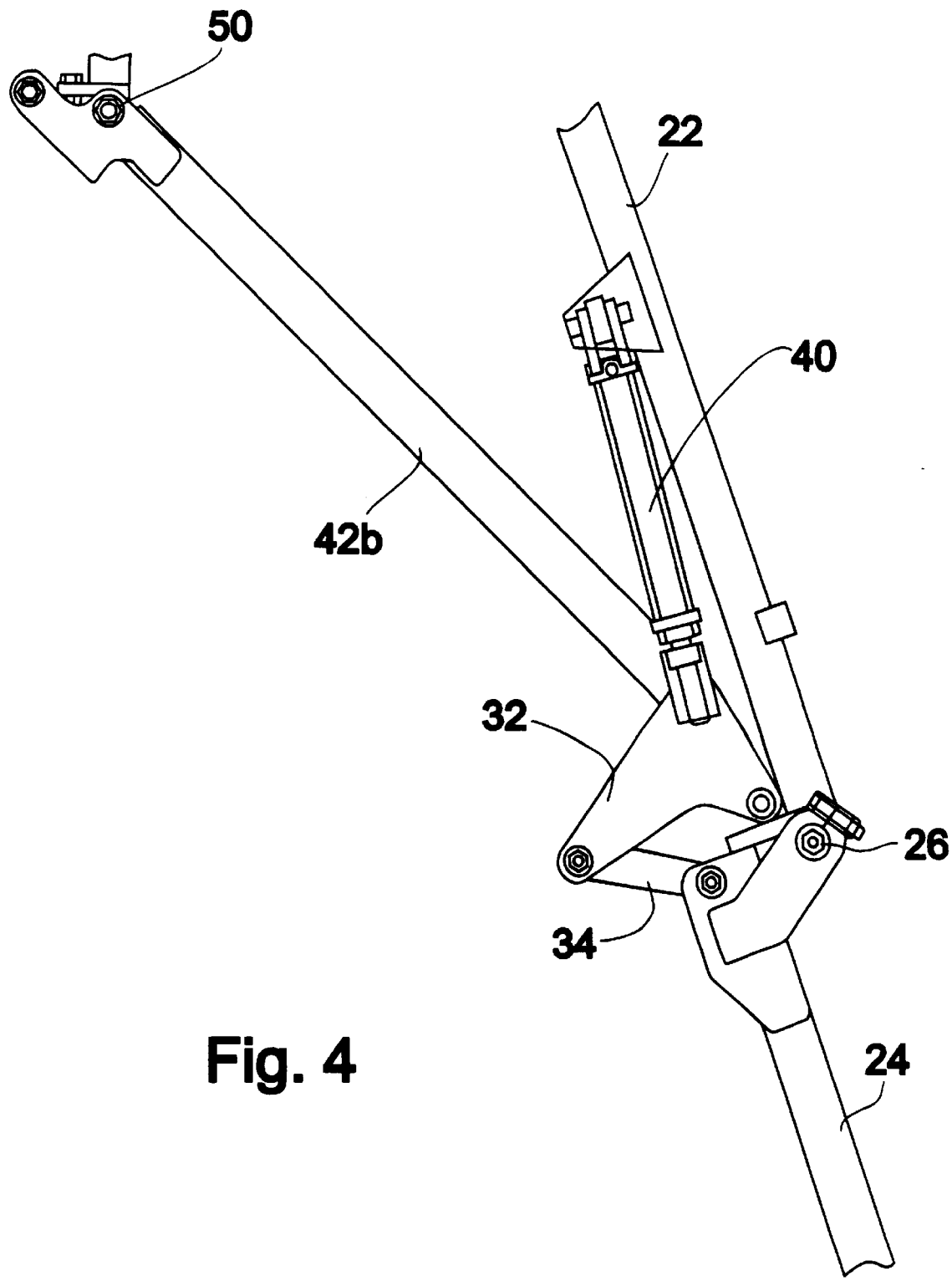
FIG. 4 is an enlarged view showing the relative position of the various components following the breakaway action.
Figure 5A:
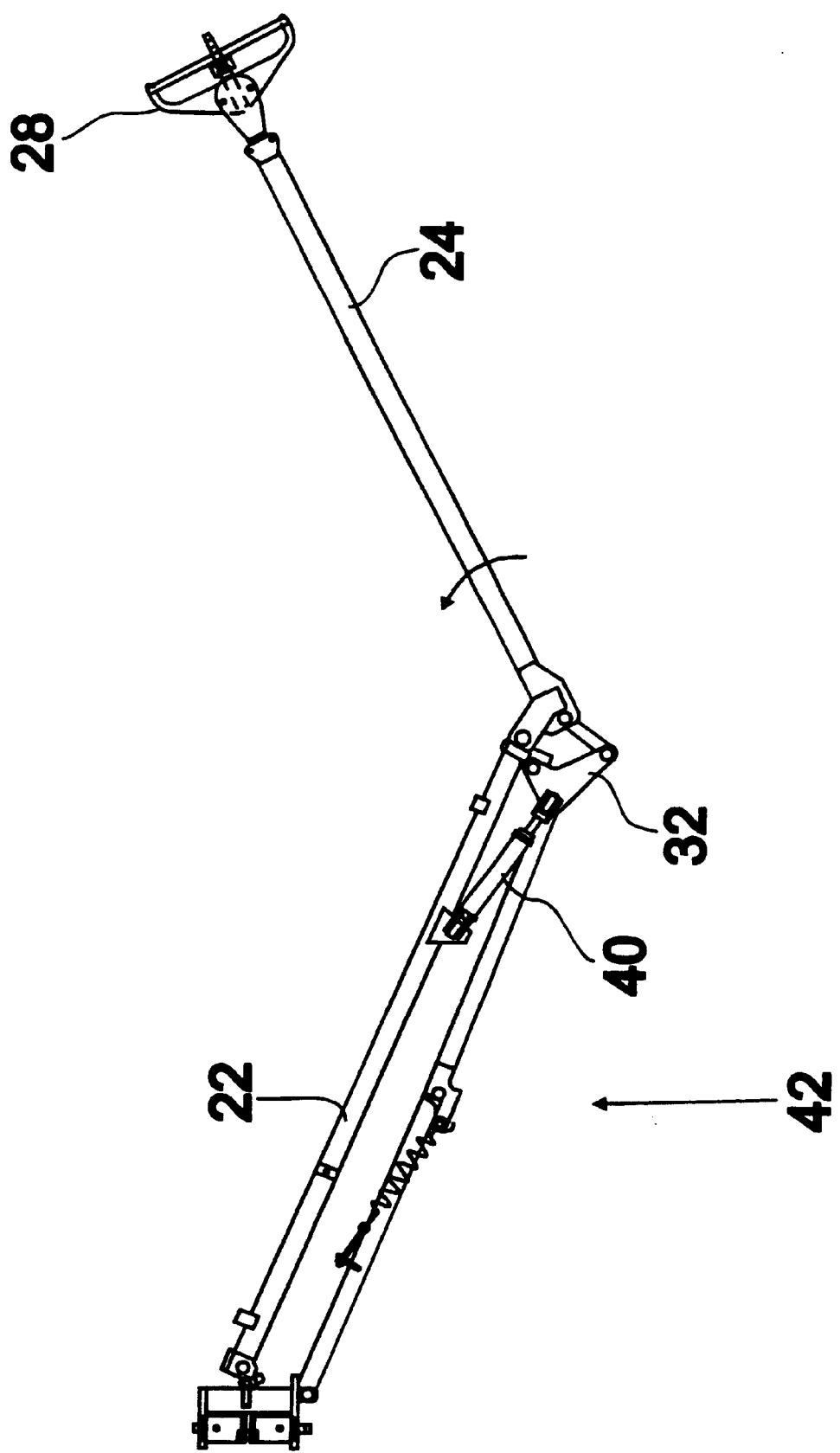
FIGS. 5a, 5b and 5c are top plan views showing the field marker being folded up from its extended operating position into a folded position alongside an agricultural machine for transport.
Figure 5B:
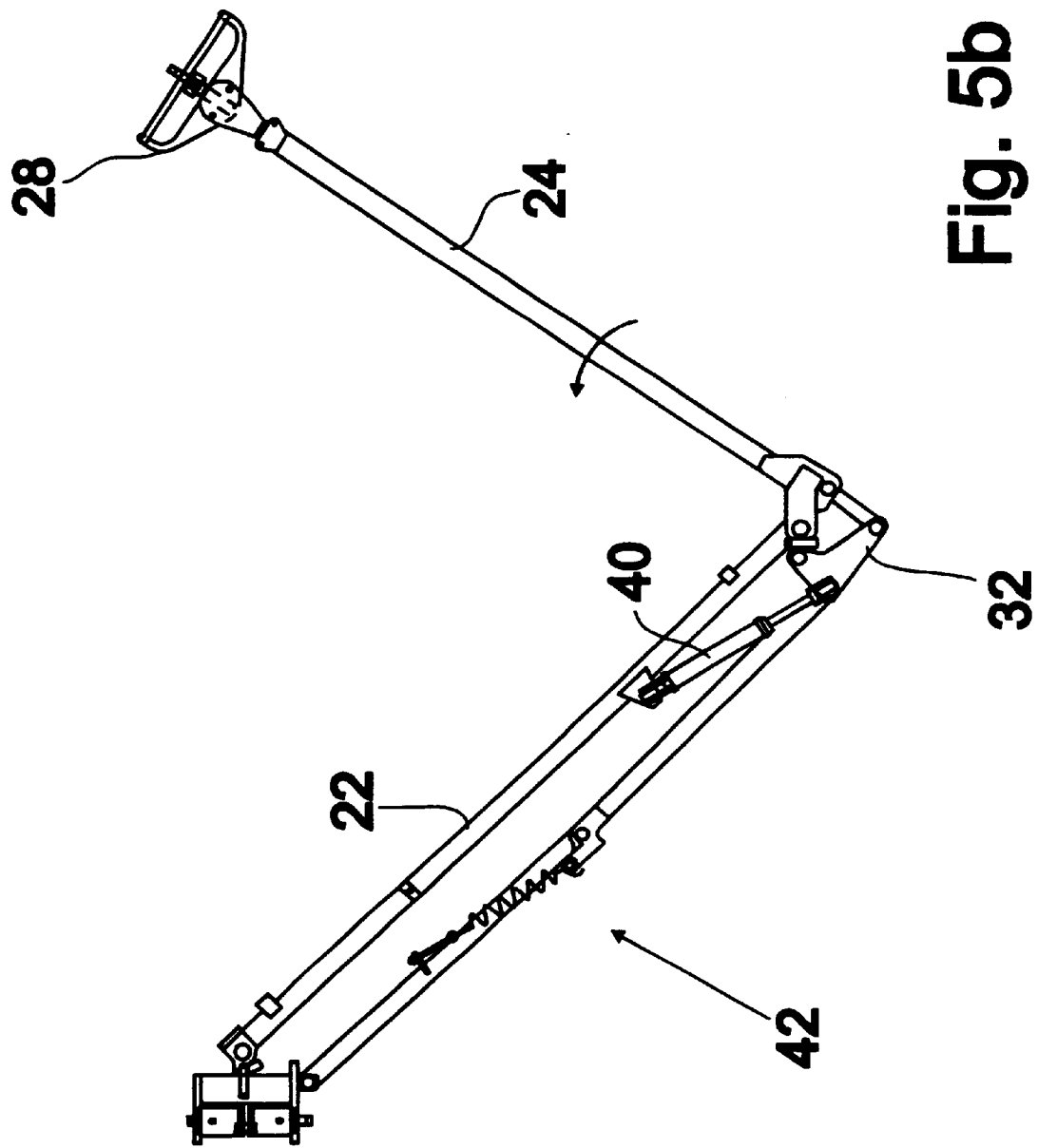
Figure 5C:
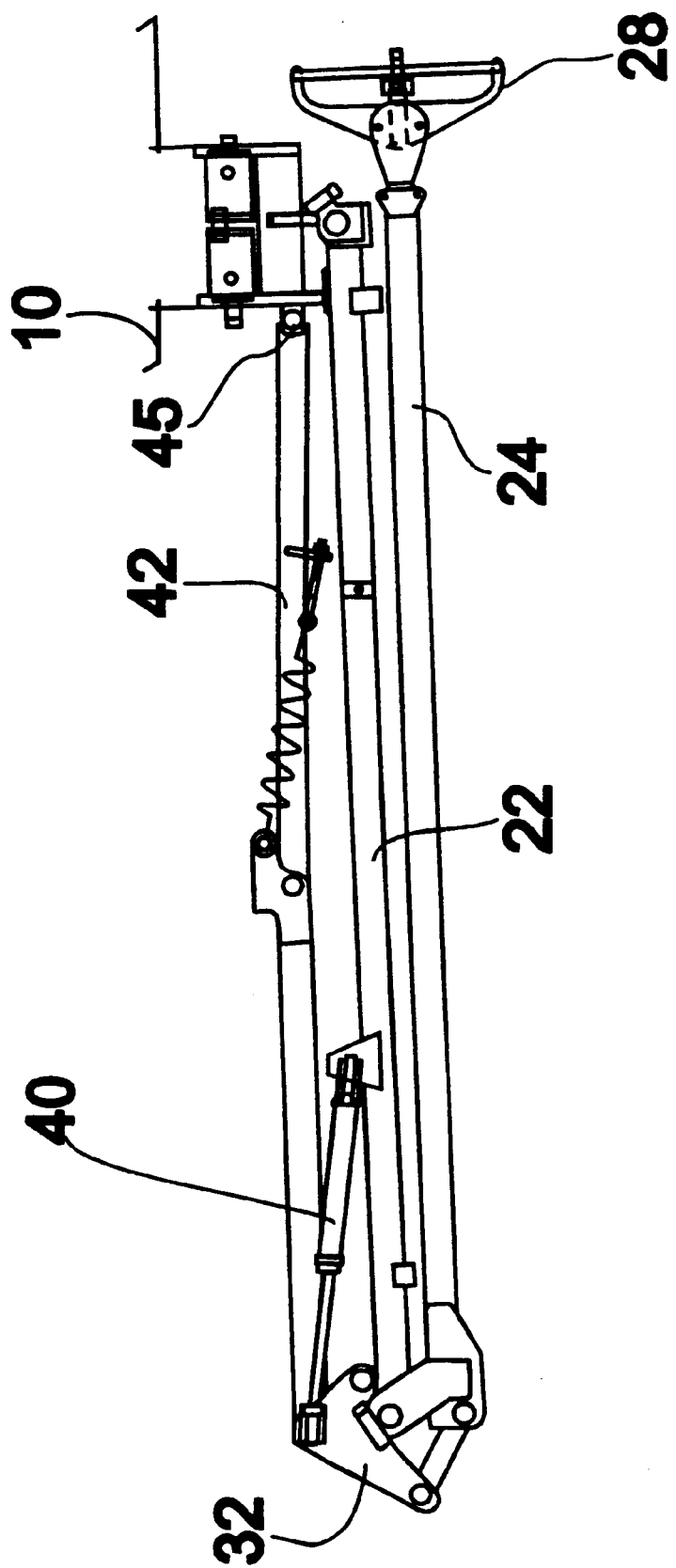
Figure 6:
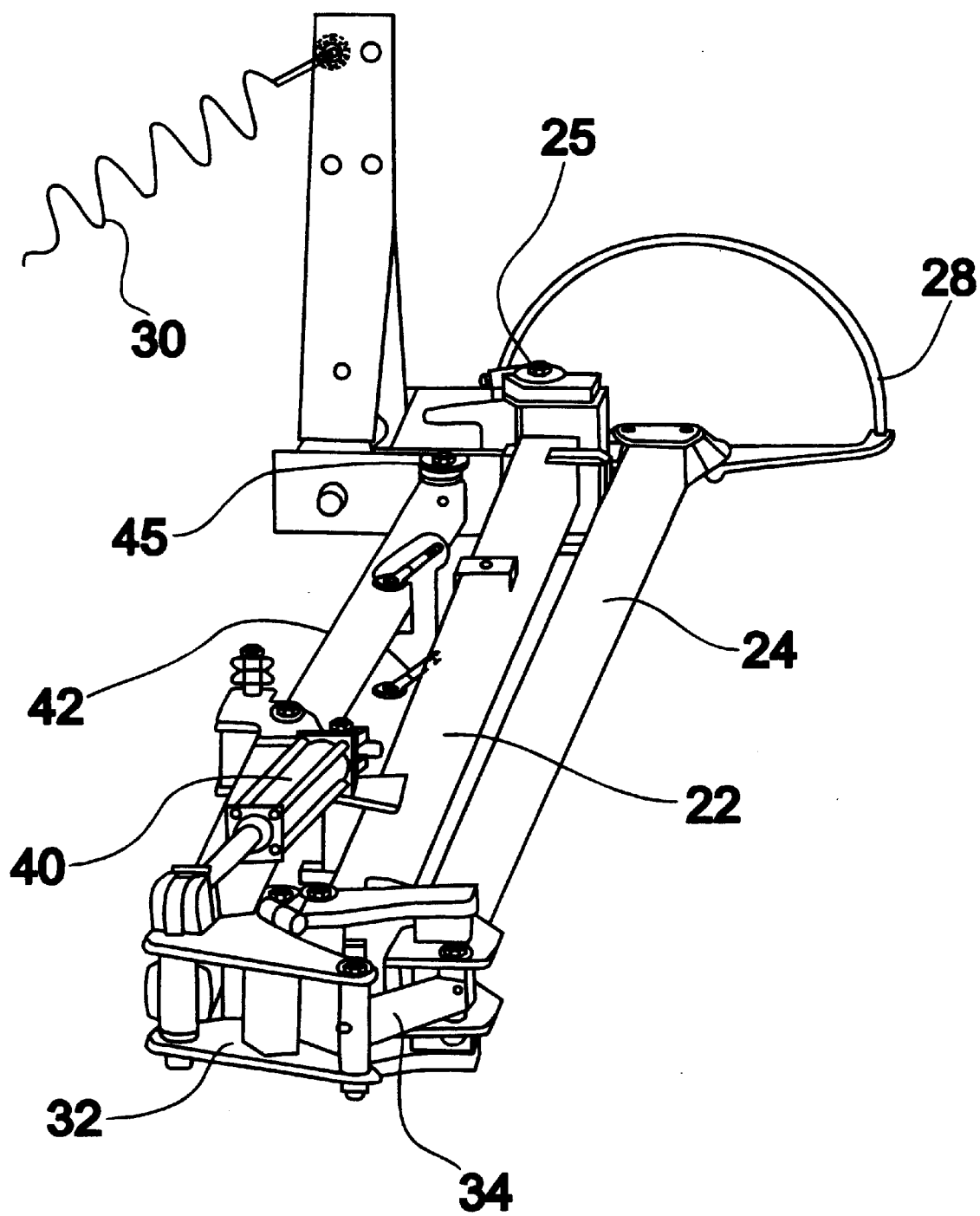
FIG. 6 is a perspective view of the field marker in the fully folded transport position.

An agricultural implement 10 is shown with the field marker 12 attached to it. The marker 12 has a mounting structure for attaching it to the implement. The mount structure comprises two main members 14 and 16. The mount member 14 attaches the marker to the implement and mount member 16 is attached to mount member 14 via a generally horizontal pivot shaft 18. The marker has an elongated arm generally designated 20. The arm is comprised of two sections: an inner arm section 22 is attached at one end to mount member 16 via a generally vertical pivot joint 25, and an outer arm section 24 is pivotally attached at one end to the second end of the inner arm section 22 via a folding joint 26. A ground engaging element 28 is attached to the distal end of the outer arm section 24 for scoring a mark in the field when operating.

In operating position, the marker inner and outer arm sections 22, 24 are held generally aligned and are extended laterally outward from the implement by rotating the arm 20 about the vertical pivot shaft 25 so that the marker arm 20 is generally transverse to the direction of travel for scoring a mark on the ground to the side of the implement as the implement moves across the field.

As the implement moves across the ground, the marker arm can pivot about the horizontal pivot shaft 18 so the outer end of the arm can move vertically relative to the implement. This accommodates variations in ground elevation between the implement and the outer end of the marker, so that the ground element 28 is allowed to follow uneven ground surfaces.

A coil tension spring 30 extending between an adjustable anchor on mount 14 and the mount member 16 provides bias to raise the arm 20 upwardly, relieving some of the weight of the arm from the ground element 28. The tension in spring 30 is adjustable so the down force on the ground element resulting from the weight of the marker arm 20 can be adjusted. Alternately this bias force can be provided by a hydraulic actuator acting under controlled pressure, possibly with use of a pressure reducing-relieving valve, and possibly in combination with soil hardness sensing.

The marker arm 20 may be folded toward the implement so it is more compact for transport. The spring 30 biases mount member 16 relative to mount member 14 about the horizontal axis of shaft 18. As the marker is folded, it's center of gravity is brought closer to this horizontal axis and the spring 30 begins to support the marker clear of the ground and keeps it in a raised position when it is fully folded for transport. As the marker is being extended, the spring 30 keeps the marker clear of the ground until it has been substantially extended.

The outer arm section 24 is folded relative to the inner arm section 22 by the action of folding crank 32 which is pivotally connected at pivot 33 near the distal end of the inner arm section 22 at a distance offset from the folding joint 26. A fold link 34 is pivotally connected at one end 36 to another point on the crank 32, and at it's second end is pivotally connected to the outer arm section 24 at a pivot point 38 offset from the joint 26. An actuator 40 is connected between the inner arm section 22 and the crank 32 and is controlled to rotate the crank. The crank 32 and fold link 34 arrangement acts to fold or unfold the outer arm section 24 relative to the inner arm section 22 through a range of about 180 degrees when the crank 32 is operated by the actuator.

A breakaway link generally designated 42 is also pivotally connected to the crank 32, link 42 extending substantially parallel to inner arm section 22. Pin 44 by which the actuator 40 is connected to the crank provides a convenient pivotal connection for the link 42. It is not required that they are connected at the same point; however the connection point is selected so that the geometry of the parallel breakaway link 42 in combination with the arrangement of the crank 32 and fold link 34 causes the inner arm section 22 to rotate through a range of about 90 degrees, when the outer arm section 24 is folded 180 degrees. The parallel breakaway link 42 is therefor also pivotally connected to the mount member 16 at pivot point 45 offset from pivot joint 25 by a selected amount which causes the action described above. Various combinations of offsets between the pivot joints of the parallel link, crank, fold link, and arm sections can be selected for a similar resulting folding motion.

The parallel breakaway link 42 is constructed of an inner link 42a and an outer link 42b, pivotally connected to each other at one end by a joint 50. The inner or proximal end of the inner link 42a is connected to mount member 16 at pivot 45 as described previously. The distal end of the outer link 42b is connected to the crank 32 as described previously. The breakaway link members 42a, 42b are biased toward substantial straight alignment; however the joint 50 between them is maintained slightly offset of a straight line between pivot joints 44 and 45, to the side opposite of the marker arm 20.

During operation, draft forces against the end of the marker arm 20 results in compressive forces in the parallel breakaway link 42. Since the joints are slightly misaligned as described above, the compressive force causes resulting reaction couples at joints 44, 45, and 50 which would tend to cause breakaway link members 42a, 42b to fold about joint 50. Outer link 42b has an extension 43 on its first end to which a resetting tension spring 52 is attached at point 54. The resetting spring 52 is also attached to the inner link 42a via a threaded tension adjusting eye bolt 56. The attachment points are arranged so that the resetting spring 52 produces a biasing moment about joint 50 which opposes the folding couples. The outer link 42b is also provided with an abutment 58 at its inner end. The inner link 42a has a corresponding abutment 60, which rests on abutment 58 when the outer and inner breakaway links 42a, 42b are in operational alignment, and maintains a selected amount of misalignment between the joints 44, 45 and 50. The abutment 60 is made adjustable by a threaded stud so that the offset of joint 50, when the link members 42a, 42b are in operational alignment, can be set to provide the desired breakaway force. The threaded adjustment bolt 56 as described above enables adjustment of the tension of resetting spring 52 for additionally setting the breakaway force and also for setting the resetting force.

The breakaway link members 42a, 42b will fold or collapse about joint 50 when the breakaway threshold is exceeded and the marker arm 12 will fold rearwardly about joint 24. During breakaway folding the marker arms sections 22, 24 are maintained in alignment by the actuator 40 and folding joint 26, which are not affected by the breakaway action. The present embodiment thus allows the arm to swing back, away from an obstacle, rather than wrap around an obstacle, (and without need for a third mount member) to allow for the breakaway action.

The force of the resetting spring 52 can be set independently of the down force biasing spring 30. The resetting spring can be set with enough force so that the marker resets automatically in many instances.

One skilled in the art will recognize that the fold actuator, as described above, does not restrict the breakaway action. Furthermore, the parallel link arrangement for folding the inner and outer arms of the marker is more reliable than the cable arrangement of certain prior art designs in which there can be slip between components. When the outer end of the marker arm is naturally being raised from the ground, as the marker arm rotates back in a breakaway manner because the axis it rotates about is inclined, the marker rotates in a plane inclined from horizontal.

In another embodiment of the invention, the parallel breakaway link has a compressible section rather than a pivotal joint. In this design the spring bears all of the breakaway force.

A modified field marker is shown in FIGS. 7–10. This marker is much the same as described and shown in FIGS. 1–6. However, the folding breakaway link 42 has been replaced with a telescoping spring-biased breakaway link 60. The parallel breakaway link arrangement 60 includes two telescoping members 62 and 64, and coil compression spring 66. Spring 66 is joined to two annular mounting plates 68 and 70; with mounting plate 68 being located on member 62 and mounting plate 70 being located on member 64.

Figure 9:
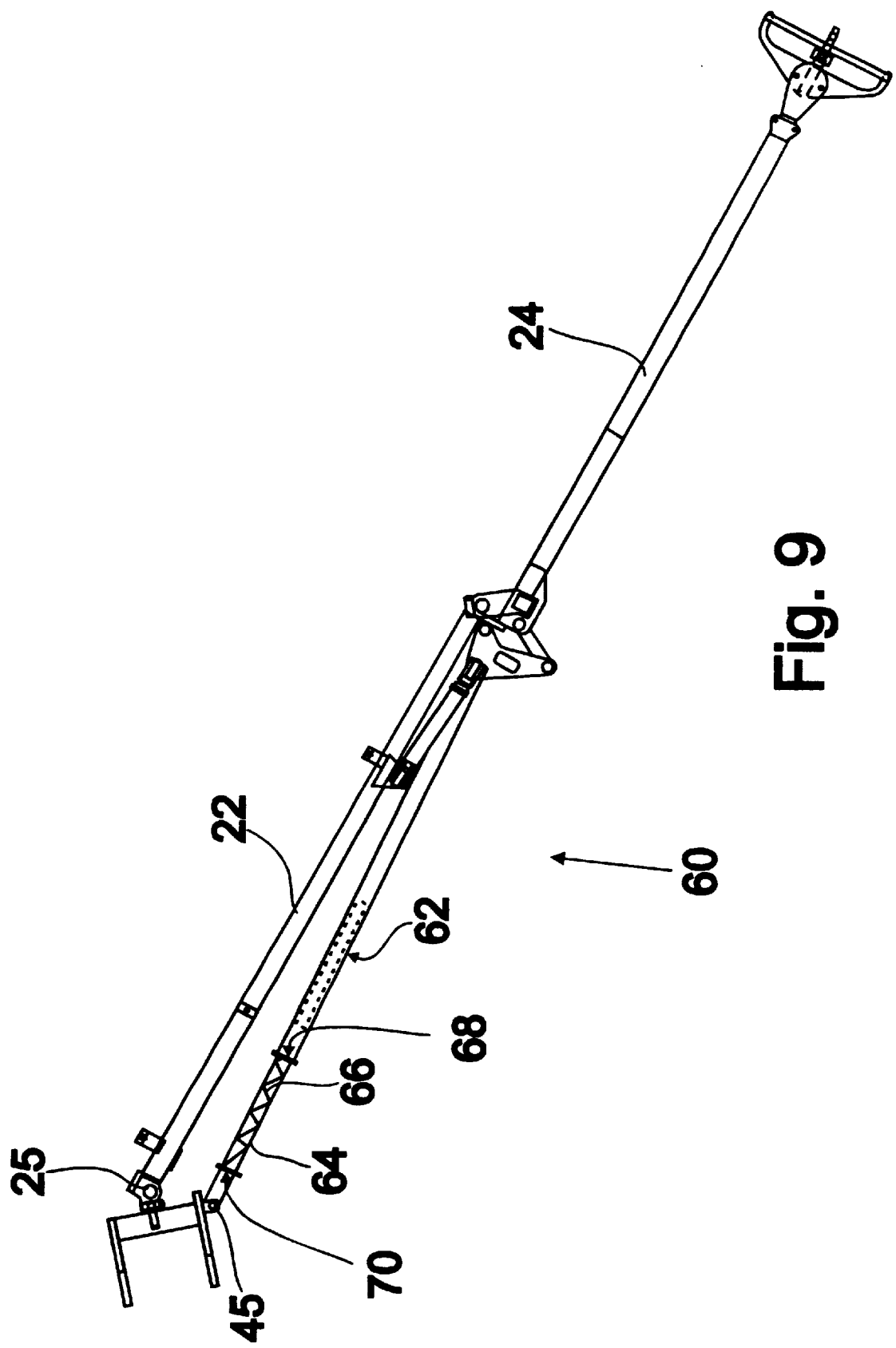
FIG. 9 is a top view of the modified field marker in a partial breakaway position.
Figure 10:
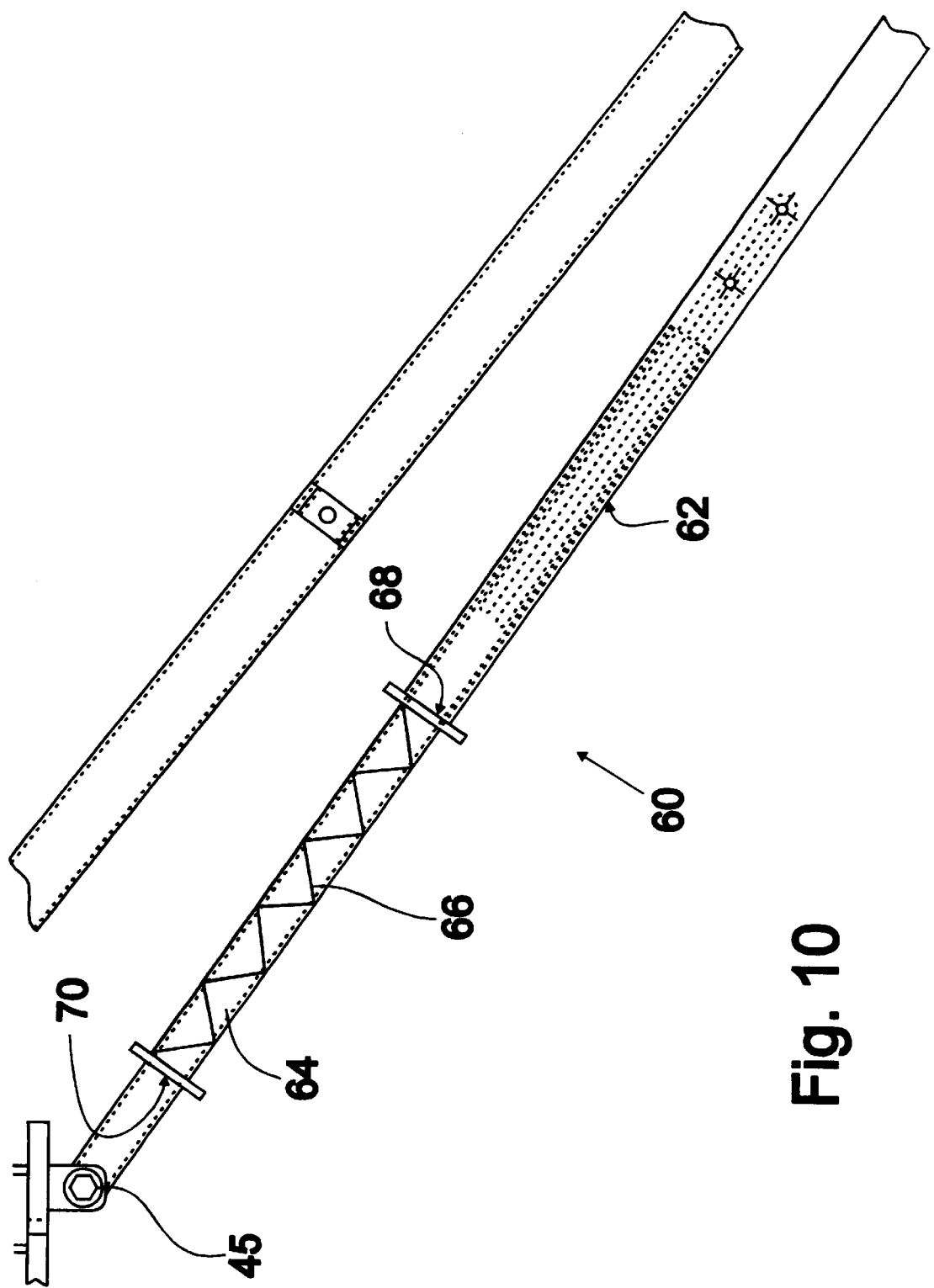
FIG. 10 is a top view of the modified field marker showing a close up view of the compression spring in a partial breakaway position.

When the field marker is traveling in soil in the direction indicated and an obstruction is encountered, the breakaway system will collapse the marker arm to allow it to swing back and pass the obstruction as seen in FIGS. 9 and 10. Member 64 is sized to telescope in and out of member 62. When the obstruction creates a force on the field marker in the direction opposite the direction of travel, member 64 telescopes into member 62. To allow this to occur, spring 66 must compress as the two mounting plates are pushed closer together.

Figure 7:
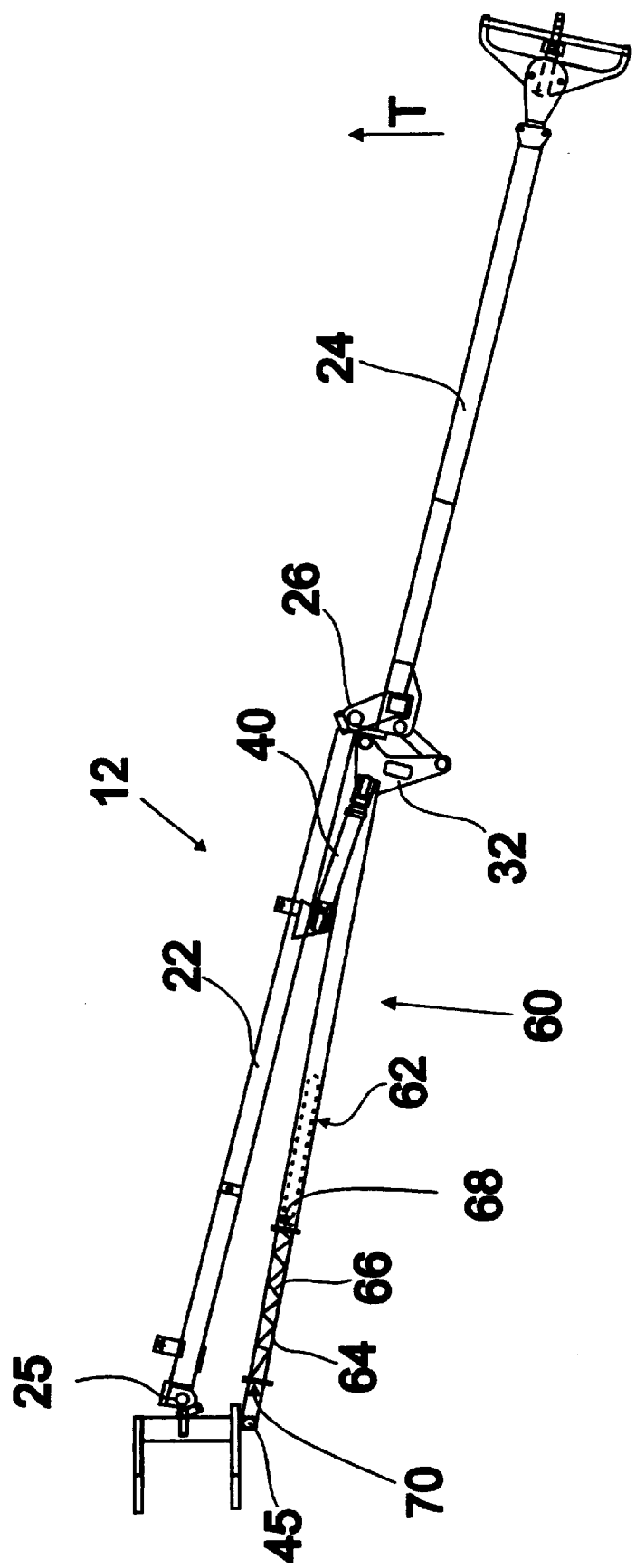
FIG. 7 is a top view of a modified version of the field marker in operating position.
Figure 8:
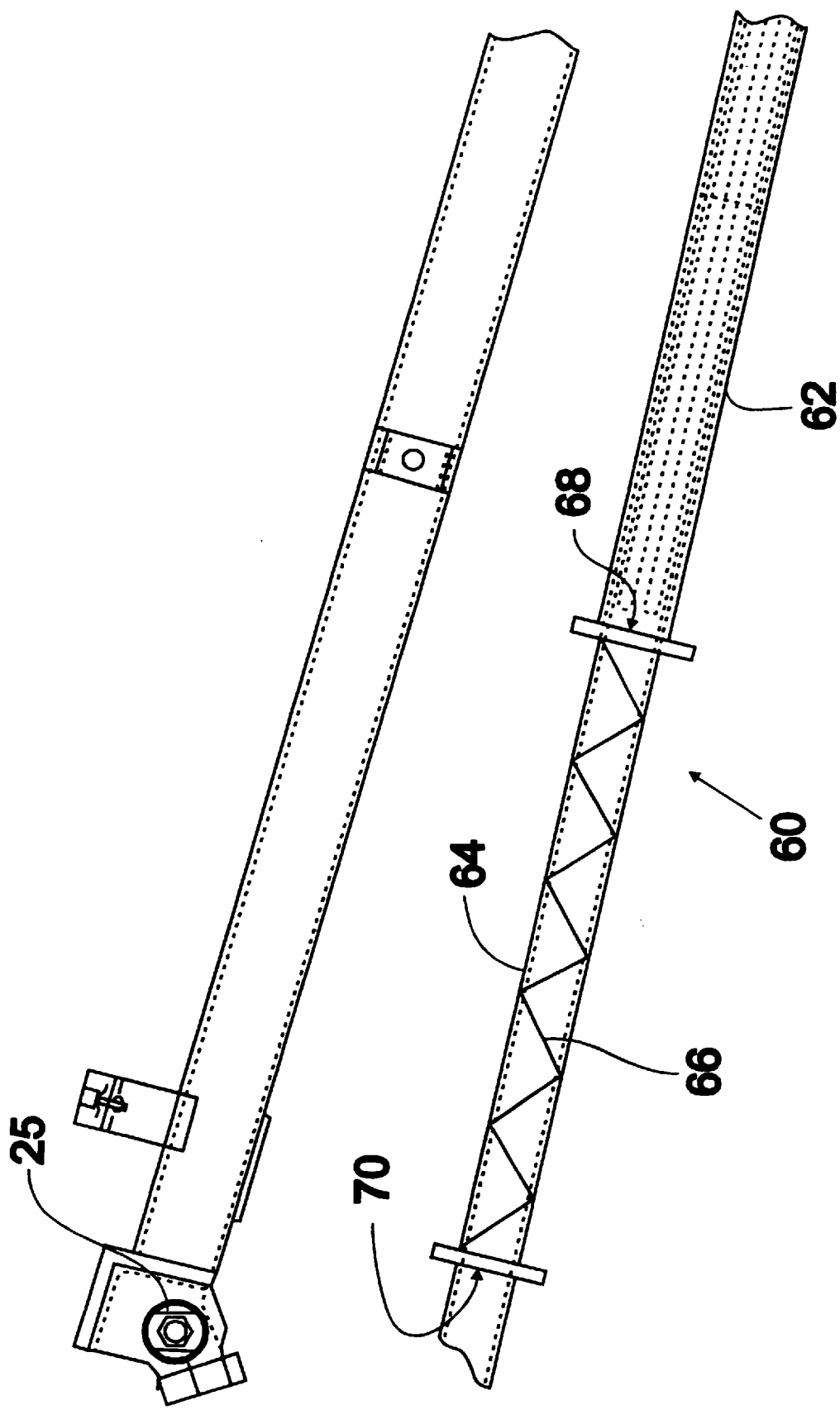
FIG. 8 is a top view of the modified field marker showing a close up view of the compression spring in operating position.

As the members telescope to shorten the overall length of the parallel breakaway link 60 and the spring compresses, the entire parallel link system will pivot about vertical axes 25 and 45. In this way, the field marker is able to swing back until the obstacle is passed. When the obstacle has been passed and the force in the direction opposite the direction of travel has been removed, spring 66 will push the mounting plates 68, 70 apart and with it, push member 64 out of member 62. The parallel link system will pivot about points 25 and 45 to the full operating position again as shown in FIG. 7.

Although this embodiment is shown in conjunction with bi-fold markers, it also has applications for tri-fold markers. For example, a tri-fold marker could have an inner section pivotally attached to the implement frame. The mount structure 14, 16 would be located at the distal end of the inner arm section. During breakaway, the marker arm outer portion(s) would swing back about the vertical pivot axis defined by the mount as described previously but the inner arm section would remain fixed and act in effect as an extension of the implement frame.

Another aspect of the invention is concerned with the fact that as field markers travel through the soil, they frequently encounter obstacles. Obstacles such as tree branches can easily get wedged between the disk at the end of the arm and the disk mounting plate. Thus, then, the rotation of the disk can be hindered and a proper marking in the ground may not be formed.

Another frequent problem with field marker disks is that of adjusting the angle of the disk with respect to the direction of travel. The angled position of the disk dictates whether the mark left in the field is more aggressive or less aggressive.

Therefore, the objectives of this aspect of the invention are to provide a shield or fender giving smooth transition from the outer arm of a field marker to the marker disk to allow the disk to slip cleanly off any obstacles encountered, to provide means of simplifying the disk angle adjustment and to provide means to maintain the smooth transition from the outer arm to the disk throughout the entire range of angle adjustment.

Figure 11:
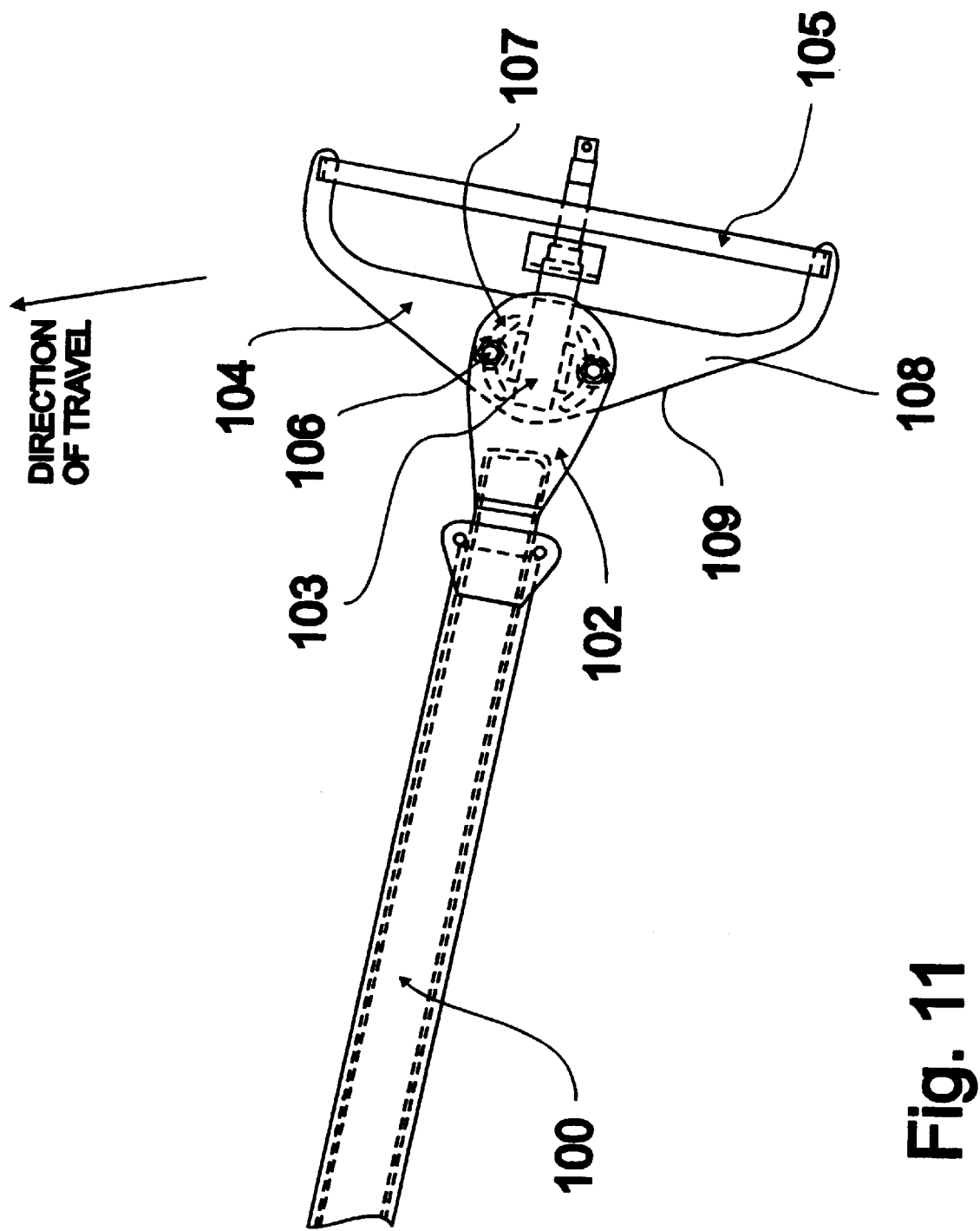
FIG. 11 is a top view of the disk end of a field marker having a shield or fender thereon and with the disk positioned to provide a less aggressive mark in accordance with a further aspect of the invention.
Figure 12:
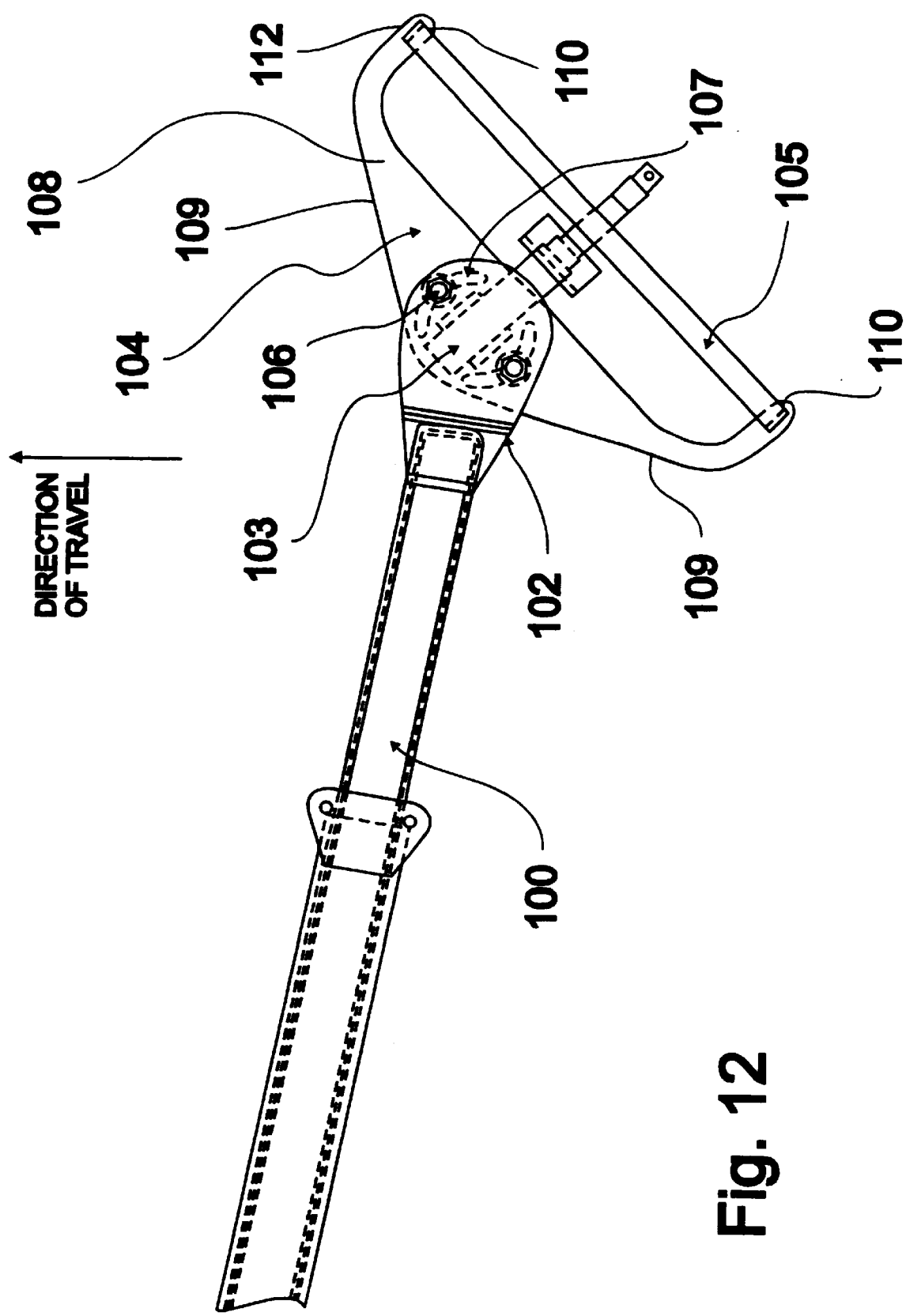
FIG. 12 is a top view of the disk end of the field marker with the disk positioned to provide a more aggressive mark.

Referring now to FIGS. 11 and 12, this embodiment of the field marker arm 100 has mounting plate 102 at the end of the marker arm. Shaft 103 rotatably mounts the coulter disk 105. Shaft 103 is seated in a shield or fender 104 bolted to the mounting plate 102. The fender 104 (made from steel plate) provides a smooth transition from the mounting plate 102 to the disk 105. The fender 104 in essence only has to be located to the side facing the direction of travel. Having the fender located on the backside of the field marker is not necessary in order to keep debris from being caught in the marker. However, a feature of the specific field marker described above is that it can be mounted on either side of the implement. Having a symmetrical fender that is located on both sides of the disk would allow the marker to be used on either side of the implement.

The fender 104 is of simple construction and provides a pair of arms 108 which extend out from the mounting plate 102 with the arms 108 having sloping shoulder portions 109 curving smoothly around toward their distal ends 112 to embrace diametrically opposed edge portions of the disc. The distal ends are notched at 110 to receive the disc edge portions loosely therein so as not to interfere with the disc rotation.

By virtue of the smooth shape of the fender 104 debris encountered in the field tends to slide along the shoulders 109 and off the arms of the fender thus avoiding fouling of the disc 105.

Fender 104 also includes two arcuate slots 107 that receive bolts 106 on the mounting plate 102. This mechanism allows for very easy angle adjustment. The bolts simply are loosened, the angle adjusted and bolts re-tightened. FIG. 11 shows the orientation of the disk for a less aggressive mark while FIG. 12 shows the orientation of the disk for a more aggressive mark.

This fender mount system can be implemented on a field marker of any configuration and any folding sequence.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A field marker for mounting on an agricultural implement comprising:

an elongated arm adapted to project outwardly laterally of the implement when in an outwardly projecting operating position and being adapted to carry a field marking device at its outer distal end for making a score mark on the ground, said elongated arm including an inner arm section and an outer arm section interconnected by a folding joint permitting said inner and outer arm sections to be folded and brought into a folded transport position;

a mount for said elongated arm at an inner proximal end thereof allowing pivoting of said arm about first and second generally transverse axes such that said elongated arm can swing upwardly and downwardly about said first axis when operating on uneven ground while also allowing said arm to swing around said second axis from its outwardly projecting operating position into another position;

a breakaway link including a pair of telescoping members pivotally connected to said mount and extending alongside said arm to retain said arm in the operating position but which permits said arm to swing relative to said mount about the second axis away from the operating position when an obstacle is encountered by said arm and a predetermined force on said arm has been exceeded;

a resetting device associated with said breakaway link to assist in returning said arm to the operating position once the obstacle has been cleared; and an actuator for effecting movement of said folding joint to move said inner and outer arm sections between said operating position and said transport position, said actuator also being operable to hold said inner and outer arm sections in general alignment as said elongated arm is moved rearwardly when an obstacle is encountered thereby.

2. The field marker of claim 1 wherein said folding joint includes a crank arm and a fold link associated therewith, said breakaway link extending from a pivotal connection on said mount in spaced relationship and generally parallel to said inner arm section to a pivot point on said crank arm, said crank arm and said fold link being adapted to cooperate with the breakaway link such that, as said inner arm section is rotated, said outer arm section rotates relative thereto.

3. The field marker of claim 2 wherein said actuator is connected between said inner arm section and said crank arm whereby extension and retraction of said actuator effects rotation of the crank arm relative to said inner arm section and at the same time by virtue of the interaction between the linkages defined by said breakaway link, crank arm, mount and inner arm section effects the rotation of the inner arm section relative to said mount.

4. The field marker of claim 1 wherein said breakaway link includes a compressible member which compresses when the predetermined force has been exceeded to permit swinging of the arm away from the operating position.

5. The field marker of claim 4 wherein the compressible member includes a compression spring on said telescoping members to bias said telescoping members in directions away from one another.

6. The field marker of claim 1 further comprising:

a biasing device acting between said mount and said arm to apply lifting forces to the arm whereby the field marking device is provided with the required degree of total down force as to enable a suitable score mark to be made.

7. In an agricultural implement for working the surface of the ground and having a frame adapted for movement over the ground; ground working devices mounted on said frame; and a field marking apparatus for making a score mark on the ground including an elongated arm adapted to project outwardly laterally of the implement when in an outwardly projecting operating position and being adapted to carry a field marking device at an outer distal end for making a score mark on the ground, a mount for said elongated arm at an inner proximal end thereof allowing pivoting of said arm, and a breakaway link pivotally connected to said mount and extending alongside said arm to retain said arm in the operating position but which permits said arm to swing relative to said mount about the second axis away from the operating position when an obstacle is encountered by said arm and a predetermined force on said arm has been exceeded, the improvement comprising:

said breakaway link including a pair of telescopic members and having a resetting device associated therewith to assist in returning said arm to the operating position once the obstacle has been cleared; and said mount defining a generally longitudinally extending pivot axis for movement of said elongated arm in a generally vertical plane, said breakaway link being connected to said mount such that said breakaway link is vertically movable with said elongated arm; and wherein said arm includes inner and outer arm sections secured together by a folding joint to permit said inner and outer arm sections to be folded and brought into a folded transport position; and including an actuator for effecting the folding about said folding joint of said inner and outer arm sections into and out of the transport position, said actuator also holding said inner and outer arm sections in general alignment as the arm is swung away from its operating position when an obstacle is encountered.

8. The agricultural implement of claim 7 wherein said mount permits pivoting of said arm about in a rearward direction such that said elongated arm can swing upwardly and downwardly about said generally longitudinally extending axis when operating on uneven ground while also allowing said arm to swing from its outwardly projecting operating position into another position.

9. The agricultural implement of claim 7 wherein said breakaway link includes a compressible member which compresses when the predetermined force has been exceeded to permit swinging of the arm away from the operating position.

10. The agricultural implement of claim 9 wherein the compressible member includes a compression spring on said telescoping members to bias said telescoping members in directions away from one another.

11. The field marker of claim 7 wherein said folding joint includes a crank arm and a fold link associated therewith, said breakaway link extending from said pivot point on said mount in spaced generally parallel relation to said inner arm section to a pivot point on said crank arm, with the crank arm and fold link being adapted to cooperate with the breakaway link such that, as said inner arm section is rotated, said outer arm section rotates relative thereto.

12. The field marker of claim 11 wherein said actuator is connected between said inner arm section and said crank arm whereby extension and retraction of said actuator effects rotation of the crank arm relative to said inner arm section and at the same time by virtue of the interaction between the linkages defined by said breakaway link, crank arm, mount and inner arm section effects the rotation of the inner arm section relative to said mount.

* * * * *